Dec. 22, 1931.  E. W. N. BOOSEY  1,837,945
FLOOR DRAIN
Filed Nov. 17, 1930
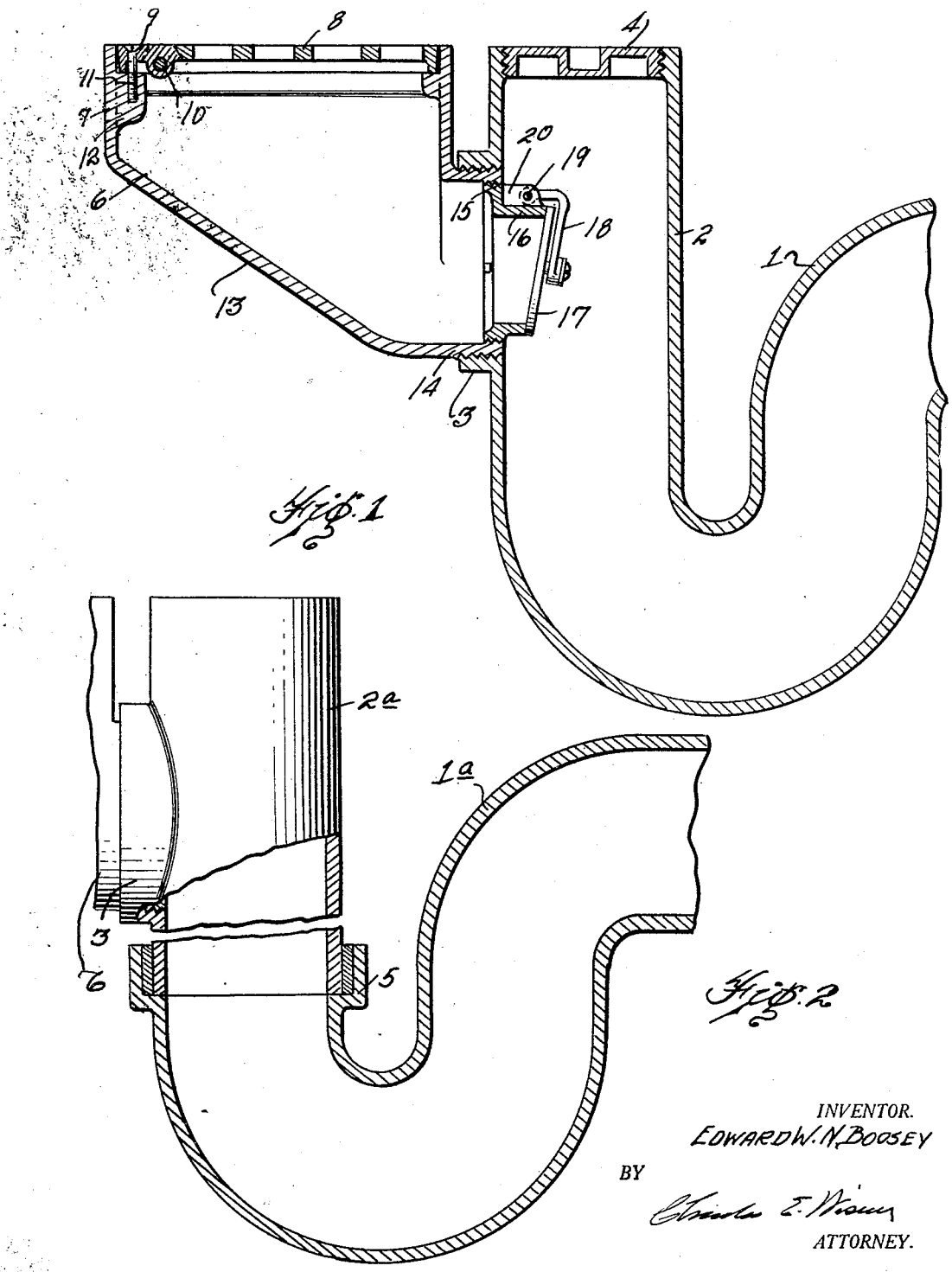
INVENTOR.
EDWARD W. N. BOOSEY
BY
ATTORNEY.

Patented Dec. 22, 1931

1,837,945

UNITED STATES PATENT OFFICE

EDWARD W. N. BOOSEY, OF DETROIT, MICHIGAN

FLOOR DRAIN

Application filed November 17, 1930. Serial No. 496,133.

This invention relates to floor drains, and the object of the invention is to provide a floor drain in which the drain head or basin is detachably connected with a trap, the vertical leg of which has a plugged end at the floor level for cleaning purposes and providing access to a back water check valve supported in the outlet end of the drain head and projecting into the leg of the trap.

The purpose of the structure is to provide a standardized construction of trap with which drain heads or basins of various sizes or forms may be associated, avoiding necessity of making the usual integral trap and basin requiring a complete set of patterns for each variation in size or form of basin.

By my invention the entire trap portion is of a standard form for which one set of patterns will be sufficient for a considerable number of different sizes of basins within the capacity of the trap and thus the cost of production is lessened and further with such an arrangement to provide a back water check valve in conjunction with the basin positioned to be accessible from the trap cleanout.

These objects and the various novel features of my invention are hereinafter more fully described and claimed, and shown in the accompanying drawings in which—

Fig. 1 is a vertical section of a combined trap and drain basin embodying my invention.

Fig. 2 is a section of a portion of the device showing an alternative form of construction.

The trap, as indicated at 1, has a vertical leg 2 formed with an internally threaded hub 3 on one side thereof and is internally threaded at its upper open end to receive the cleanout plug 4. Preferably this trap 1 and vertical leg 2 are formed integrally.

In Fig. 2 the trap proper, a portion of which is indicated at 1ª terminates in a hub 5 and a vertical member 2ª, corresponding to the member 2 of Fig. 1, is caulked in the said hub 5. Thus, the leg may be made integral or separately from the body of the trap as occasion may require. The distance of the trap below the floor line may vary to some material degree and for this purpose a longer vertical leg is required and by the arrangement shown in Fig. 2 this may be attached to the trap in such cases in which it is undesirable to form a trap with an integral vertical leg of the proper length.

The basin 6 is of the same construction for either of the forms of trap shown in Fig. 1 or Fig. 2 and consists of the basin like portion 7 provided with the grating 8 of any approved type preferably one that is hinged to a stationary part as by means of the pin 10. When a grating of this type of construction is used the stationary part 9 is secured in the part 7 by means of a screw 11 passing through the stationary part and threaded in a thickened portion 12 of the basin wall.

The bottom 13 of the basin is inclined and extends to below the basin terminating in a cylindrical outlet portion 14 adapted to be threaded in the hub 3 of the vertical leg 2 or 2ª as the case may be. This basin 6 may be of any approved form or size while the outlet portion 14 is always of uniform diameter for association with the hub 3.

The outlet portion 14 of the basin at its outer end is interiorly threaded to receive the threaded casting 15 which may be inserted through the basin and into the outlet member 14. This member 15 has a tubular portion 16 projecting a short distance into the interior of the vertical leg 2 and the end thereof is finished at an angle to the vertical as shown to provide a seat for a back-water swing-check valve 17. The valve 17 is supported by means of an arm 18 from a pivot pin 19 in the ear 20 on the upper side of the tubular portion 16. It is to be noted that the diameter of the threaded portion 15 of the swing check valve is greater than any other portion of the device thus permitting introduction of the device through the outlet portion 14 of the basin to the position shown in the drawing.

By the arrangement of parts described, the basin 6 and the assembled swing check valve and casting 15 may be removed or inserted as a unit in the threaded hub 3 and one of the features of the invention is in the provision of the externally and internally threaded outlet 14 of the basin, the parts so arranged that the casting 15 and valve assembled thereon may be separately removed or inserted through the leg 2 or through the basin and also may be assembled with the basin and the assembled basin and swing check valve parts introduced or removed as a unit.

By this arrangement of the parts, the basin, which is at the floor line, is positioned at the same level as the upper end of the vertical leg 2 of the trap which is closed by the cleanout plug 4. By removal of this plug, access is had to the interior of the trap to clean the same and the back water swing check valve is positioned immediately below this opening and examination and cleaning of the valve may be readily made without disassembling the parts.

It is further to be noted that the swing check valve is above the seal level in the trap and is not only accessible through the plugged end of the vertical leg of the trap but is visible through the said end when open due to its projecting into the said leg at a point directly below the opening.

It is believed evident from the foregoing that the various objects of the invention are attained by the construction described; that a floor drain is provided in which the drain head or basin is detachably connected with the trap permitting an interchange of the various sizes or forms of basins with a standard size of trap thereby lessening the cost of manufacture and reducing the amount of stock necessary to be carried by the distributor.

Having thus briefly described my invention, its utility and mode of operation, what I claim and desire to secure by Letters Patent of the United States is—

1. A floor drain comprising a trap having a vertical leg provided with an internally threaded hub on one side, a drain head consisting of a basin like member, the bottom portion of which is inclined to discharge material to one side, said bottom terminating in a cylindrical outlet portion externally threaded for threaded engagement with the said hub of the trap, said cylindrical outlet portion of the drain also being internally threaded, a back water check valve structure including a part externally threaded for threaded relation with the internal threads of the drain head outlet, the upper end of the vertical leg being approximately flush with the upper end of the basin, a plug for the said upper end of the vertical leg, and a grating at the upper end of the basin.

2. A floor drain comprising a trap having a vertical leg provided with an internally threaded hub on one side below the upper end thereof, a drain head having a tubular outlet portion extending to one side thereof externally threaded for threaded relation with said hub of the vertical leg, the interior of the said drain head outlet being internally threaded, a back water swing check valve consisting of a tubular element having a peripheral portion at one end greater in diameter externally threaded for threaded relation with the interior of the drain head outlet, the said tubular portion of the check valve structure projecting into the leg of the trap, a swing check valve pivotally supported on the said tubular portion within the trap, the swing check valve being insertible to and removable from position through the drain head and when in position being accessible through the upper end of the vertical leg, a cleanout plug for the open end of the leg, and a grate for the basin or drain head.

3. In a floor drain, a drain head having a grated upper end portion through which material may be discharged thereinto, a tubular outlet on one side at the bottom, a discharge conduit provided with a vertical tubular portion having a threaded hub on one side below its upper end to receive the outlet portion of the drain head, the upper end of the said vertical member being practically flush with the upper end of the drain head, a plug for sealing the same, a back water check valve mounted in the outlet of the drain head and extending into the said vertical portion of the outlet conduit and accessible through the upper end thereof.

4. A floor drain comprising a basin like element having a tubular outlet at the bottom extending to one side thereof, an outlet member having a vertical portion provided with an inlet on one side below its upper open end, the outlet portion of the drain head being adapted for detachable connection with the inlet of the said vertical portion, a back water check valve detachably mounted in the outlet portion of the drain head and including a valve element positioned in the said vertical portion of the outlet element accessible through the said open end thereof, and a plug for sealing the said open end of the vertical element.

5. A floor drain comprising a trap having a vertical leg provided with an inlet on one side, a drain head adapted for detachable connection with the trap, the drain head having an outlet discharging through the said inlet of the vertical leg, and a back water check valve supported in the outlet of the drain head.

6. A floor drain comprising a trap having a vertical leg provided with an inlet on one side, and an open end, a closure for the said open end, a drain head adapted for detachable connection with the trap, said head having an outlet discharging through the said inlet of the vertical leg, and a back water check valve supported in the outlet of the drain head and positioned in the said vertical leg above the level of the seal of the trap whereby it is both visible and accessible through the open end of said leg.

7. A floor drain comprising a trap having an inlet and a closable opening, a drain head at one side thereof having an outlet at its bottom, the trap and drain head being arranged to provide a passage between the outlet of the drain head and the inlet of the trap, and a back water check valve of a size to permit insertion thereof into the passageway through the drain head or through the closable opening of the trap, and means within the passageway for supporting the check valve in a manner to permit removal without disassembling the trap and drain head.

In testimony whereof I sign this specification.

EDWARD W. N. BOOSEY.